C. H. PRAGER.
CHART FOR TEACHING.
APPLICATION FILED FEB. 25, 1918.

1,300,871. Patented Apr. 15, 1919.

Fig. 1.

C. H. Prager, INVENTOR

C. H. PRAGER.
CHART FOR TEACHING.
APPLICATION FILED FEB. 25, 1918.

1,300,871.

Patented Apr. 15, 1919.
2 SHEETS—SHEET 2.

Fig. 2.

C. H. Prager, INVENTOR,

WITNESSES
Howard D. Orr.
F. T. Chapman.

BY
[signature]
ATTORNEY

UNITED STATES PATENT OFFICE.

CLARENCE H. PRAGER, OF MUSKOGEE, OKLAHOMA.

CHART FOR TEACHING.

1,300,871.      Specification of Letters Patent.      Patented Apr. 15, 1919.

Application filed February 25, 1918. Serial No. 219,028.

*To all whom it may concern:*

Be it known that I, CLARENCE H. PRAGER, a citizen of the United States, residing at Muskogee, in the county of Muskogee and State of Oklahoma, have invented a new and useful Chart for Teaching, of which the following is a specification.

This invention has reference to charts for teaching, and its object is to provide a chart whereby a record may be kept by a pupil as to the efficiency of the pupil in solving certain problems.

The invention comprises a chart having spaces for checking the standing of the pupil, in a class as to the relative time in which the problems are finished, and other spaces wherein may be checked the fact whether or not a problem has been correctly solved. On the chart may be prepared a graphic representation of the standing of the pupil with respect to the other pupils in the class in the solution of a group of problems. Furthermore provision is made in the chart for designating the difficulty of the problems.

To supplement the chart there may be provided another chart for a summary of the efficiency of the pupil through a stated period, such as a week, or for some other time period, in order that progress may be ascertained over an extended period for comparison with other extended periods.

The invention will be best understood from a consideration of the following detailed description taken in connection with the accompanying drawings forming a part of this specification, with the understanding, however, that the invention is not confined to any strict conformity with the showing of the drawings, but may be changed and modified so long as such changes and modifications come within the scope of the appended claims.

In the drawings,—

Figure 1 is a face view of a sheet containing two charts, the sheet being capable of constituting a page of a book of charts.

Fig. 2 is a face view of another sheet containing summary charts which may represent a page of the same book containing the charts of Fig. 1.

Referring to the drawings, Fig. 1 shows sheet 1 on which are produced two charts 2. It is to be understood, however, that the sheet may contain one chart only or more than two, the number of charts used on a sheet being a matter of convenience. Because of the character of the charts a convenient form of chart book will be provided if two charts be placed side by side upon a single sheet.

Each chart is confined within an outline 3. At the top of the chart is a line 4 preceded by the word "Pupil" indicated at 5, the line 4 defining a space within which the pupil's name may be written. Below the line 4 is another line 6 preceded by the word "Teacher" indicated at 7; and below the line 6 are the words "Date" indicated at 8 and "Grade" indicated at 9. Immediately below the words "Date" and "Grade," which are on the same line, is another line 10 and at a distance below the line 10 is still another line 11, the lines 10 and 11 being of a distinguishing character as may be produced by imprints from two or more closely adjacent rules or in any other suitable manner. Near the left-hand side of the chart but sufficiently spaced therefrom is a line 12 perpendicular to the lines 10 and 11 and arranged lengthwise of the chart, the other two lines 10 and 11 being arranged crosswise of the chart.

The space between the line 12 and the right hand side of the chart is occupied by suitably separated cross lines 13 and longitudinal lines 14, thereby dividing the portion of the chart between the lines 10 and 11 into boxes 15 and the portion of the chart below the line 11 into boxes 16. The lines 13 are continued across the space between the line 12 and the left hand side of the chart forming other boxes 17.

The boxes of the crosswise series immediately beneath the line 10 and between the line 12 and the right hand side of the box are occupied by consecutive numbers 18, the particular numbers shown in the drawing ranging from 1 to 13 inclusive, but such particular number is not obligatory.

The box at the top of the column of boxes between the line 12 and the left hand side of the chart is occupied by the designation "Sec.," shown at 19, this being a contraction of the word "seconds," representing time. Those boxes immediately below the box containing the designation "Sec." are occupied by numbers indicated at 20, such numbers being the numbers 75, 60, 45, 30, and 15, representing such numbers of seconds of time. Beneath the number 15, representing 15 seconds, and above the line 11, is a box containing the characters √ and 0, the first character being an arbitrary symbol to represent correctness, and the second character being the recognized symbol of failure, that is zero.

Within the boxes 17 below the line 11 is a series of consecutive numbers which, in the particular showing of the drawing, range from 1 to 31, inclusive, these numbers being intended to designate the serial standing of the pupil as to the relative time in solving a problem in comparison with the other pupils in the same class.

The chart is assumed to be prepared particularly for problems in addition, and in order to teach rapid addition it is important to emphasize and to watch the time given to each problem, the correctness of answer of each problem, the standing of the pupil in the class, and the number of problems given at each period. It is further important that the maximum of efficiency with a minimum of time and energy be aimed at.

The end to be sought by the use of the charts is to train the students to concentrate and add correctly a certain number of figures within a specified time, experience having taught that the number of figures should be 100 to be correctly added within 60 seconds and this may be attained in twelve weeks by intensive training.

At the beginning relatively short problems should be given, say sums in addition containing not more than 25 figures which, after a sufficient period of training, should be correctly added by the average pupil in not more than fifteen seconds. The figures used in these sums may be variously arranged, for instance the arrangement may be five figures wide and five figures deep, to be followed by other sums with the figures otherwise arranged, but not exceeding 25 in number. Then for another period of time following the first period, larger numbers of figures, say in the neighborhood of 50 may be grouped in various ways to provide problems in addition. Then again, for a third training period, the numbers may be increased to 75 or thereabout, and then a fourth period may include 100 figures variously arranged to provide problems in addition. The result to be aimed at is the correct addition of 100 figures in 60 seconds of time.

The manner of using the chart may be best explained by taking an example. Suppose John Doe is one of the students, and suppose the problems given are 25-figure problems, each to be performed in 15 seconds.

Let it be assumed that on problem No. 1, the pupil gets the right answer, then he will place a check mark within the first box to the right of the box containing the check and zero marks. If John Doe be the first student to finish the problem he will place a dot within the first box to the right of line 12, immediately below the line 11. Suppose, however, that other pupils are quicker than John Doe, and when he has finished the problem it turns out that he is number 16 in the class, then he places the dot to the right of the number 16. On the second problem the pupil under consideration may be assumed to have finished earlier, say number 12, whereupon he places a dot in the box opposite number 12 in column 2. On the third problem he did better coming out number 10 and correspondingly places a dot; but on the fourth problem he drops somewhat behind to number 14; and on the fifth problem he finishes as number 15. So the pupil may continue until all thirteen problems have been solved; whereupon the pupil joins the dots in order by lines which present a graphic representation of his standing in the class for the problems solved. For all correctly solved problems he places checks in the proper columns in the boxes immediately above the line 11, and for those problems which are not correctly solved he places zeros in the same line of boxes.

The teacher calls time on each problem and if John Doe succeeds in doing the problem within the time limit of 15 seconds he places a check mark in the proper box opposite the number 15 under the designation "Sec.", leaving blank those spaces where the time used is beyond the limit. In case the time limit is exceeded the pupil may place a check mark at a higher point than that represented by the series of boxes preceded by the number 15, say within those boxes preceded by the number 30.

Of course the pupil must be placed on honor to put down the correct markings, and then the pupil will have visibly presented an efficiency chart conducive to concentration and speed, together with correctness, these being highly important factors in certain businesses, such for instance as bookkeeping or the like.

In Fig. 2, is shown a page 21 with a column 22 containing the names of the school days of the week, that is from Monday to Friday. These names are separated from a series of boxes 23 by a line 24 arranged lengthwise of the page and these boxes are arranged in columns headed by numbers 25 running from 1 to 31 inclusive.

Below the boxes 23 and separated therefrom by a suitable cross line 26 are numerous words and designations whereby a general summary of the work for the week may be set forth, this summary showing the number of problems tried, the number of problems correctly solved, the number of problems on which failures were made, the number of problems under the different time limits, the percentage of the problems correctly solved, the percentage of those finished on time, and the percentage calculated from those done on time and those which were correct, so that the pupil may readily ascertain from week to week the degree of progress and have continuously an incentive for improving the work and striving toward and possibly attaining perfection.

The sheet 21 is shown as containing two charts, and between these charts there may be left spaces for data as to the pupil's name and other items.

The sheets of charts may conveniently be bound up into book form, thus giving to the pupil a collected record of the work done over an extended period of time and by arousing interest in the work will incite the pupil to improve the character of the work toward the desired ideal.

While in the example given of the working of the chart, the problems assumed are those of addition, it will be understood that the chart may be used to show the efficiency of pupils in solving other kinds of problems.

What is claimed is:

1. Means for showing the standing of a pupil in a class of pupils with respect to problems to be solved, comprising a chart containing a series of columns of boxes lined off on a sheet with the columns headed by a series of consecutive numbers representing the problems in order and flanked by another orderly series of numbers, one of the flanking series of numbers representing the number of pupils in the class and the other flanking series of numbers representing seconds of time allotted to the solution of the problems, whereby the numbers heading the columns and one set of the numbers flanking the columns may be utilized in the production of a graphic delineation showing the standing of the pupil with respect to the other pupils in solving the problems, and the other series of numbers flanking the columns may be utilized for the designation in the boxes opposite them of the character of the problems with respect to the time allotted to their solution, the efficiency of the pupil being thereby indicated by the chart as a whole.

2. Means for showing the standing of a pupil in a class of pupils with respect to problems to be solved, comprising a chart containing a series of columns of boxes lined off on a sheet with the columns headed by series of consecutive numbers representing the problems in order and flanked by another orderly series of numbers, one of the flanking series of numbers representing the number of pupils in the class and the other flanking series of numbers representing seconds of time allotted to the solution of the problems, whereby the numbers heading the columns and one set of the numbers flanking the columns may be utilized in the production of a graphic delineation showing the standing of the pupil with respect to the other pupils in solving the problems, and the other series of numbers flanking the columns may be utilized for the designation in the boxes opposite them of the character of the problems with respect to the time of the problems with respect to the time allotted to their solution, the efficiency of the pupil being thereby indicated by the chart as a whole, said chart also having one of the series of boxes extending crosswise of the sheet allotted for the designation by arbitrary symbols of the correctness or incorrectness of the solutions worked out by the pupils and said series of boxes having representations of the arbitrary symbols associated with it in the column containing the flanking series of numbers.

In testimony that I claim the foregoing as my own I have hereto affixed my signature in the presence of two witnesses.

CLARENCE H. PRAGER.

Witnesses:
E. D. CAVE,
MARGUERITE R. MORRISON.

Copies of this patent may be obtained for five cents each, by addressing the "Commissioner of Patents, Washington, D. C."